(12) United States Patent
Ishimoda et al.

(10) Patent No.: US 7,715,128 B2
(45) Date of Patent: May 11, 2010

(54) LENS BARREL AND IMAGE PICKUP APPARATUS

(75) Inventors: Isao Ishimoda, Hachioji (JP); Hiroshi Hasegawa, Machida (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/349,114

(22) Filed: Jan. 6, 2009

(65) Prior Publication Data

US 2009/0174955 A1   Jul. 9, 2009

(51) Int. Cl.
  *G02B 7/02* (2006.01)
(52) U.S. Cl. .................. 359/819; 359/821; 359/822
(58) Field of Classification Search ........... 359/819, 359/821, 822, 823, 824, 826, 811, 813
  See application file for complete search history.

(56) References Cited

U.S. PATENT DOCUMENTS

2006/0087751 A1 * 4/2006 Liu et al. .................... 359/819

FOREIGN PATENT DOCUMENTS

JP   2007-271648   10/2007

* cited by examiner

*Primary Examiner*—Timothy J Thompson
(74) *Attorney, Agent, or Firm*—Finnegan, Henderson, Farabow, Garrett & Dunner, L.L.P.

(57) ABSTRACT

A lens barrel includes: an image pickup optical system including a plurality of lenses. The plurality of lenses includes an adjusting lens for a shift adjustment in a direction perpendicular to an optical axis of the image pickup optical system. The lens barrel further includes a lens frame holding the adjusting lens; and a housing holding the lens frame and including a wall portion. The lens frame comprises a plurality of protrusions coming contact with the wall portion and each of the plurality of protrusions has a protruding amount which differs from the other for correcting a tilt of an optical axis of the adjusting lens.

10 Claims, 5 Drawing Sheets

LENS BARREL AND IMAGE PICKUP APPARATUS

This application is based on Japanese Patent Application No. 2008-002067 filed on Jan. 9, 2008, in Japanese Patent Office, the entire content of which is hereby incorporated by reference.

TECHNICAL FIELD

The present invention relates to a lens barrel that holds an image pickup optical system and to an image pickup apparatus equipped with the lens barrel, and in particular, to an adjusting lens for shift-adjustment in the direction perpendicular to an optical axis.

BACKGROUND

A camera equipped with a zoom lens has been commercially available. In the zoom lens, a plurality of lens groups are moved in the direction of an optical axis to change a focal length of the zoom lens by changing spaces of the plural lens groups.

Further, there is known a camera wherein its optical axis is bent by 90° by arranging a prism in an optical system of a zoom lens. The camera of this kind has a merit that a lens barrel does not protrude in the course of photographing.

A zoom lens is composed of many single lenses and lens groups. Therefore, when the zoom lens is incorporated in a lens barrel, the property of the zoom lens is adversely affected by errors in respective lenses and by assembly errors.

Under the aforesaid background, there are provided patent publications about lens barrels. For example, Unexamined Japanese Patent Application Publication (JP-A) No. 2007-271648 discloses a lens barrel including a zoom lens whose optical system includes an adjusting lens for shift-adjustment in the direction perpendicular to an optical axis of the optical system for correcting errors in respective lenses and assembly errors.

In JP-A No. 2007-271648, the adjusting lens is fixed on a lens frame, and the lens frame is held on a housing together with other lenses to be shiftable in the direction perpendicular to the optical axis. This lens barrel is composed of two housings, and one housing holds a front optical system of a zoom lens, and the other housing holds a rear optical system of the zoom lens. Then, the lens frame that holds the adjusting lens is arranged at a position where the two housings are connected.

Unitizing a lens barrel by constituting it with two housings improves efficiency in terms of assembly and repairing, but it increases errors when securing lens property.

Therefore, it is considered to arrange the entire optical system of the zoom lens in one housing, which reduces errors compared with employing a lens barrel constituting with two housings. However, there still remain errors in respective lenses and assembly errors even when employing a single housing, because a zoom lens is composed of many lenses. It also requires an adjusting lens for a shift-adjustment.

In the lens barrel, an inside of the housing is formed variously in terms of shapes and dimensions depending on a lens to be held. The housing is generally molded with resin. Therefore, the housing is formed to have a cross section in a substantially square shape and to have one surface extending in parallel with the optical axis being open. A metal mold for forming the inside of the housing is drawn out in the direction that the housing opens. In other words, the housing is formed to have a cross section in a U-shape obtained when cutting the housing in the direction perpendicular to the optical axis, and a metal mold that forms the inside of the housing is drawn out in the direction of the opening of this U-shape.

However, when the metal mold for forming the inside of the housing is drawn out in this way, a draft angle in a certain degree is needed. A lens frame that holds an adjusting lens is held on a wall portion provided inside the housing extending in the direction that is almost perpendicular to the optical axis. Thus, the wall portion has a draft angle because the wall portion is formed by drawing out of the metal mold in the same way as described above.

As a result, the lens frame that holds the adjusting lens is tilted by the draft angle of the wall portion, resulting in a problem that the adjusting lens is also tilted away from the optical axis, which adversely affects lens property.

The housing may be molded without a draft angle on the wall portion. However, when deformation and shrinking is caused after molding in this case because of characteristics of resin, a surface of the wall portion that holds the adjusting lens would be tilted in the opposite direction to the tilt of the draft angle, in some cases. As a result, there is also caused a problem in a tilt of the adjusting lens in the same way as in the above description.

Further, even in the case where the housing is molded without a draft angle of the wall portion, and the wall portion does not tilt after being molded, the lens barrel would not provide sufficient lens property in some cases, due to a balance with a lens frame that holds other lenses. In this case, it is sometimes possible to obtain better lens property by tilting the adjusting lens intentionally.

In the meantime, when the lens barrel is formed by two housings and a lens frame that holds an adjusting lens is arranged at a position where the two housing are connected as shown in JP-A No. 2007-271648, the wall portion that is in contact with the lens frame can be formed by drawing the mold in the optical axis direction. Therefore, a draft angle is not needed and the aforesaid problem is not caused. Therefore, JP-A No. 2007-271648 discloses neither problems nor an embodiment about correction of the tilt of the adjusting lens.

SUMMARY

The present invention has been achieved in view of the problems stated above, and there is provided a lens barrel and an image pickup apparatus equipped with the lens barrel as follows. The lens barrel comprises: an image pickup optical system comprising a plurality of lenses. The plurality of lenses includes an adjusting lens for a shift adjustment. The lens barrel further comprises a lens frame and a housing holding the lens frame. The lens frame holds the adjusting lens. The housing comprises a wall portion extending along a direction substantially perpendicular to the optical axis of the image pickup optical system. The lens frame comprises a plurality of protrusions coming contact with the wall portion and having predetermined protruding amounts. When the lens frame is held on the wall portion, the adjusting lens is not tilted by a draft angle of the wall portion, or the adjusting lens is tilted in the desired direction as occasion demands.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
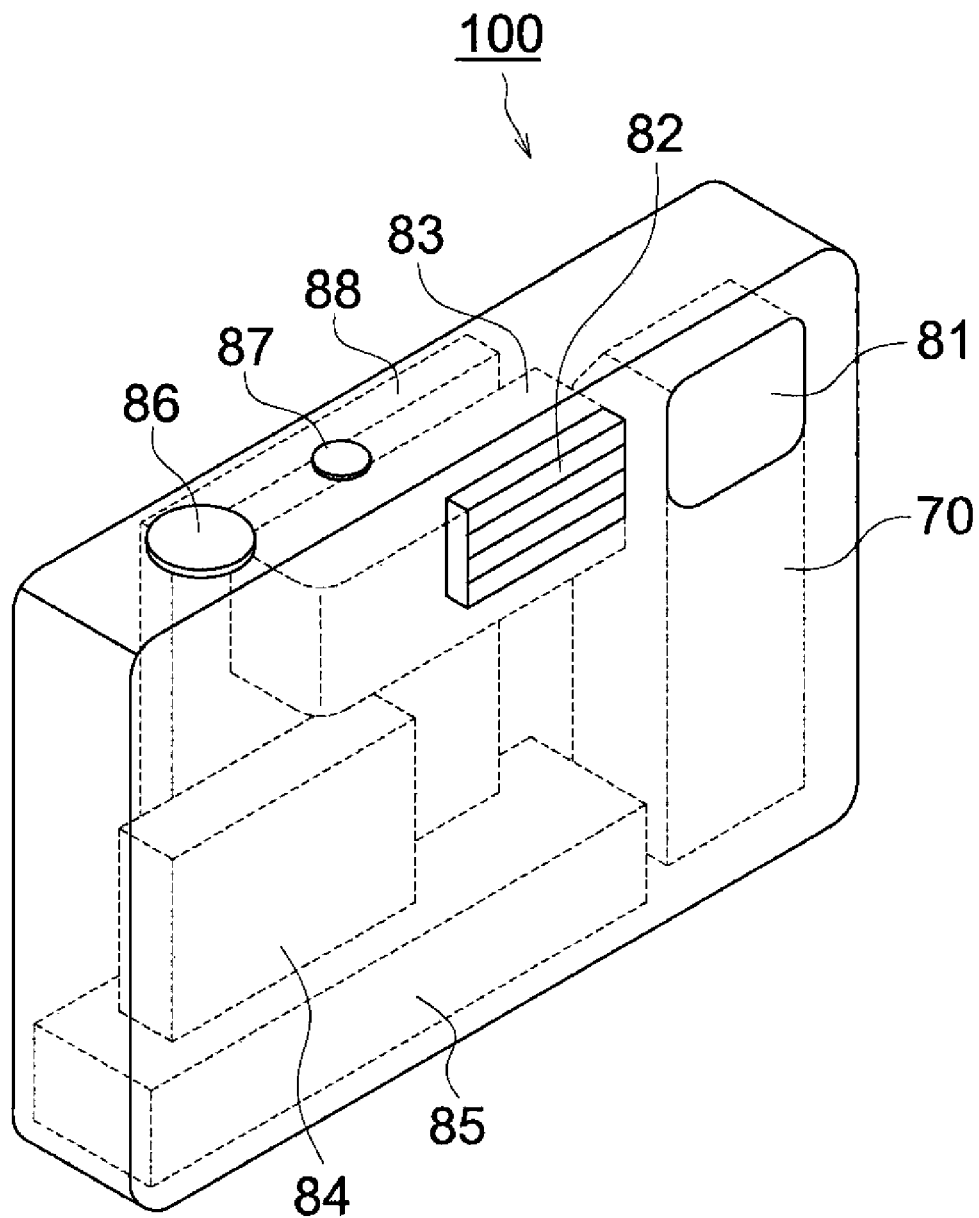
FIG. 1 is a perspective view showing internal arrangement of primary instituting units of a camera.

The proffered embodiments of the present invention will be disclosed below.

One preferred embodiment is a lens barrel comprising: an image pickup optical system comprising a plurality of lenses. The plurality of lenses includes an adjusting lens for a shift adjustment in a direction perpendicular to an optical axis of the image pickup optical system. The lens barrel further comprises a lens frame holding the adjusting lens; and a housing holding the lens frame. The housing comprises a wall portion extending along a direction substantially perpendicular to the optical axis of the image pickup optical system. The lens frame comprises a plurality of protrusions coming contact with the wall portion and each of the plurality of protrusions has a protruding amount which differs from the other for correcting a tilt of an optical axis of the adjusting lens.

In the embodiment, it is preferable that the housing comprises a cross section in a direction perpendicular to the optical axis of the adjusting lens, and the cross section opens facing a predetermined direction so as to forming a U-shape.

In the embodiment, it is preferable that the wall portion inclines at a predetermined angle away from a direction perpendicular to the optical axis of the image pickup optical system to form a draft angle for molding the housing.

In the embodiment, it is preferable that the adjusting lens is shiftable for the shift adjustment away from the lens frame in a direction perpendicular to the optical axis of the image pickup optical system.

In the embodiment, it is preferable that the lens frame holding the adjusting lens is shiftable for the shift adjustment away from the housing in a direction perpendicular to the optical axis of the image pickup optical system.

In the embodiment, it is preferable that a through hall for transmitting an effective light flux emitted from the adjusting lens is formed on each of the lens frame and the wall portion.

In the embodiment, it is preferable that the image pickup optical system is a variable power optical system and comprising a plurality of lens groups moving along the optical axis of the image pickup optical system for varying a power of the image pickup optical system, and the adjusting lens does not move along the optical axis of the image pickup optical system for varying the power.

In the embodiment, it is preferable that the image pickup optical system comprises an optical system for bending an optical path of a light flux entering thereto.

In the embodiment, it is preferable that the housing is formed as one body and holds lenses arranged on an optical axis segment forming one straight line on which the adjusting lens is arranged.

Another embodiment of the present invention is an image pickup apparatus comprising: a lens barrel of the above embodiment.

In the lens barrel and the image pickup apparatus equipped with the lens barrel of the above embodiment, when the lens frame holds the adjusting lens and the lens frame is held on the wall portion formed in the housing with extending in the direction almost perpendicular to the optical axis, the adjusting lens is not tilted. In addition, even in the case where the wall portion is not tilted, it is possible to obtain better lens property by tilting the adjusting lens intentionally.

Embodiments of the invention will be explained in detail as follows, referring to the drawings.

FIG. 1 is a perspective view showing internal arrangement of primary instituting units of camera 100 that is an example of an image pickup apparatus equipped with a lens barrel relating to the invention.

In the camera 100, lens barrel 70 holding a power variable image pickup optical system longitudinally extends on the right side as illustrated, and opening 81 through which a subject light enters is arranged above the lens barrel 70. On the opening 81, there is provided an unillustrated lens barrier that can be switched into an open state that the opening 81 is exposed and a closed state that the opening 81 is covered.

There is further provided a flash light emitter window 82, and flash unit 83 composed of a light reflector, a xenon tube, a main capacitor and a circuit board is arranged behind the flash light emitter window 82. FIG. 1 further show card-type image recording memory 84, and battery 85 that supplies power source to respective portions of camera 100. The image recording memory 84 and the battery 85 are composed to be capable of being mounted on and dismounted from camera 100, by developing an unillustrated cover member.

On the top surface of the camera 100, there is arranged release button 86. Photometry and focusing are conducted by depressing the release button 86 to the first step, and exposure is given by depressing the release button 86 to the second step. There is further provided main switch 87 which switches the state of operation and the state of non-operation of the camera. When the camera is switched to the state of operation by the switch 87, the aforesaid lens barrier is made to be in the open state, and operations of respective portions are started. Further, when the camera is switched to the state of non-operation by the switch 87, the lens barrier is made to be in the closed state, and operations of respective portions are terminated.

On the back surface of the camera, there is arranged image display section 88 that is composed of LCD or the like and displays images and character information. There are further arranged operation members such as a zoom button for doing zoom up and zoom down, a reproduction button for reproducing a photographed images, a menu button that displays various types of menus on image display section 88 and a selection button that selects desired functions from a display, which are not illustrated.

Among these primary constituent units, there are arranged circuit boards which connect respective parts and carry respective types of electronic parts which are not illustrated, to drive and control the primary constituent units. In the same way, there are arranged external input and output terminals, strap fixing sections and a tripod pedestal which are not illustrated.

Figure 2:
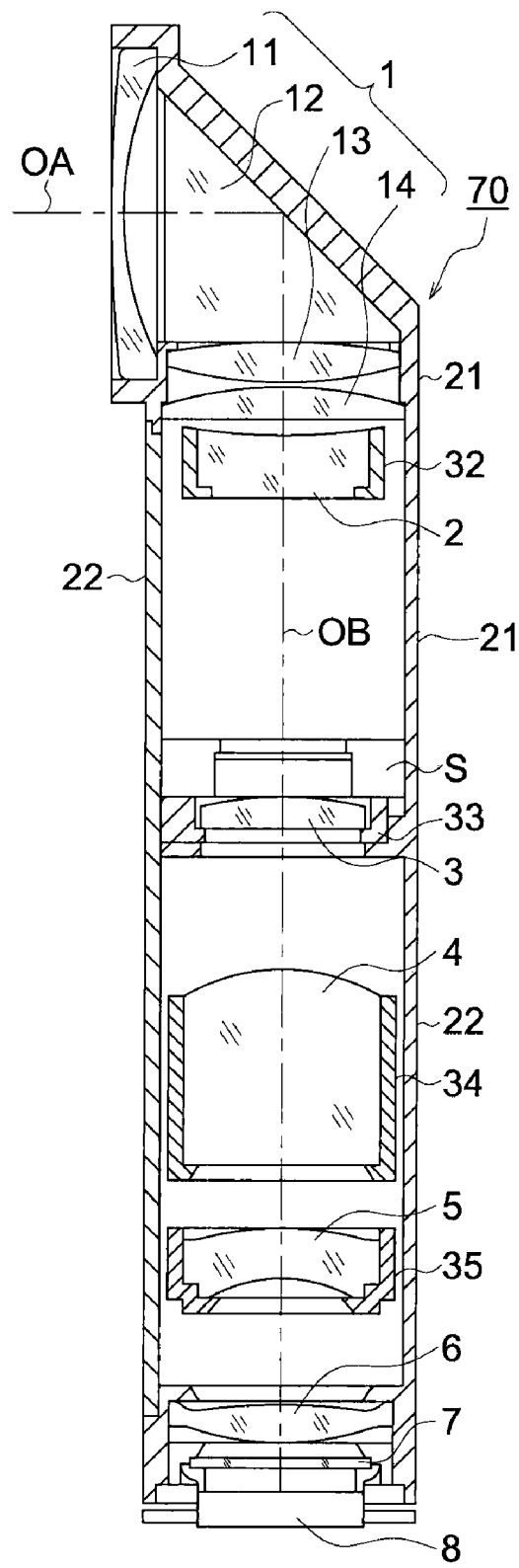
FIGS. 2(A) and 2(B) are diagrams showing an image pickup optical system that is held in a lens barrel.
Figure 2:
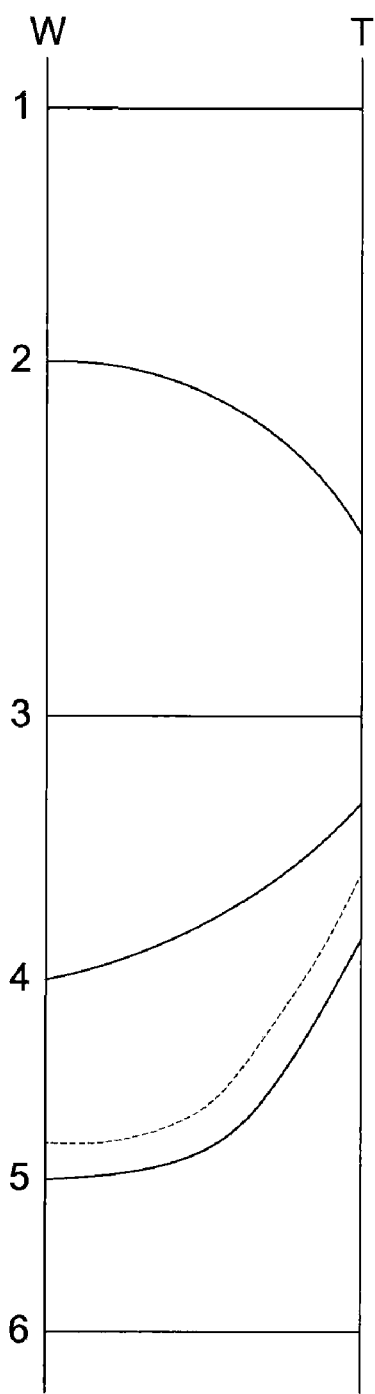

FIGS. 2(A) and 2(B) is a diagram showing an image pickup optical system that is held by lens barrel 70. FIG. 2(A) is a diagram showing a longitudinal sectional view of lens barrel 70 and FIG. 2(B) is a diagram showing movement of each lens group forming an image pickup optical system.

The image pickup optical system includes first lens group 1 which is composed of lens 11, prism 12, lens 13 and lens 14. A subject light flux that has passed opening 81 in FIG. 1 passes through lens 11 and is deflected by prism 12 (in other words, the light flux is deflected by the optical system for bending an optical path of a light flux entering thereto). The light flux further passes through lens 13 and lens 14. Therefore, optical axis OA of lens 11 is almost perpendicular to optical axis OB of lens 13 and lens 14. The first lens group 1 is fixed on housing 21, and does not move.

The image pickup optical system includes second lens group 2 which is held by lens frame 32. The second lens group 2 moves backward along optical axis OB for varying power from wide-angle end (W) to telephoto end (T), as shown in FIG. 2(B).

The image pickup optical system includes shutter unit S which houses therein an unillustrated sector and a diaphragm.

The image pickup optical system includes third lens group 3 (adjusting lens) which is held by lens frame 33. The lens frame 33 is further fixed on housing 21, thus, the third lens group does not move. However, the third lens group 3 is shifted for shift-adjustment in the direction perpendicular to optical axis OB, for correcting errors in errors of respective lens groups and assembly errors, as will be described later.

The image pickup optical system includes fourth lens group 4 which is held by lens frame 34. The fourth lens group 4 moves forward along optical axis OB for varying power from wide-angle end (W) to telephoto end (T).

The image pickup optical system includes fifth lens group 5 which is held by lens frame 35. The fifth lens group 5 moves forward along optical axis OB for varying power from wide-angle end (W) to telephoto end (T). Incidentally, after varying power, the fifth lens group 5 further moves within a range shown with solid lines and broken lines in FIG. 2(B), for adjusting the focus.

The image pickup optical system includes sixth lens group 6 which is fixed on housing 21. The sixth lens group 6 does not move.

The image pickup optical system includes optical filter 7 in which an infrared blocking filter and an optical lowpass filter are laminated. The optical filter 7 is fixed on the second housing 22.

The image pickup optical system includes image pickup element 8 for which an infrared blocking filter or an optical lowpass filter is used. The image pickup element is fixed on housing 21.

Further, a shape of cross section of the housing 21 taken in the direction perpendicular to optical axis OB is formed to be almost in a U-shape. In the cross section, there is formed a bottom portion facing a right side of FIG. 2(A) and two side walls extends vertically to the bottom portion. Therefore, the housing 21 includes an opening section which opens facing the left side of FIG. 2(A). The opening section is covered by cover member 22.

Figure 3:
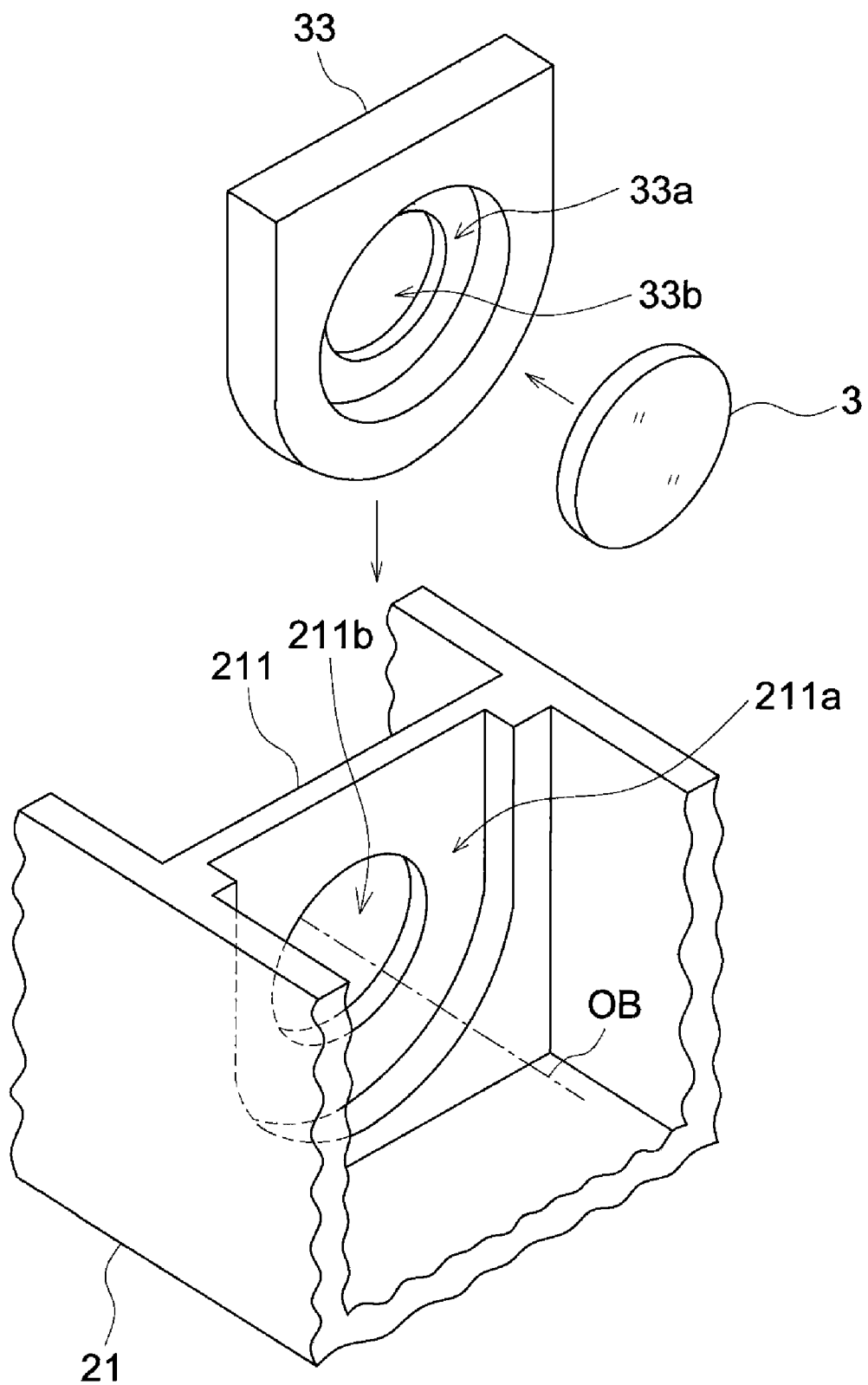
FIG. 3 is a perspective view of the third lens group and a lens frame.
Figure 4:
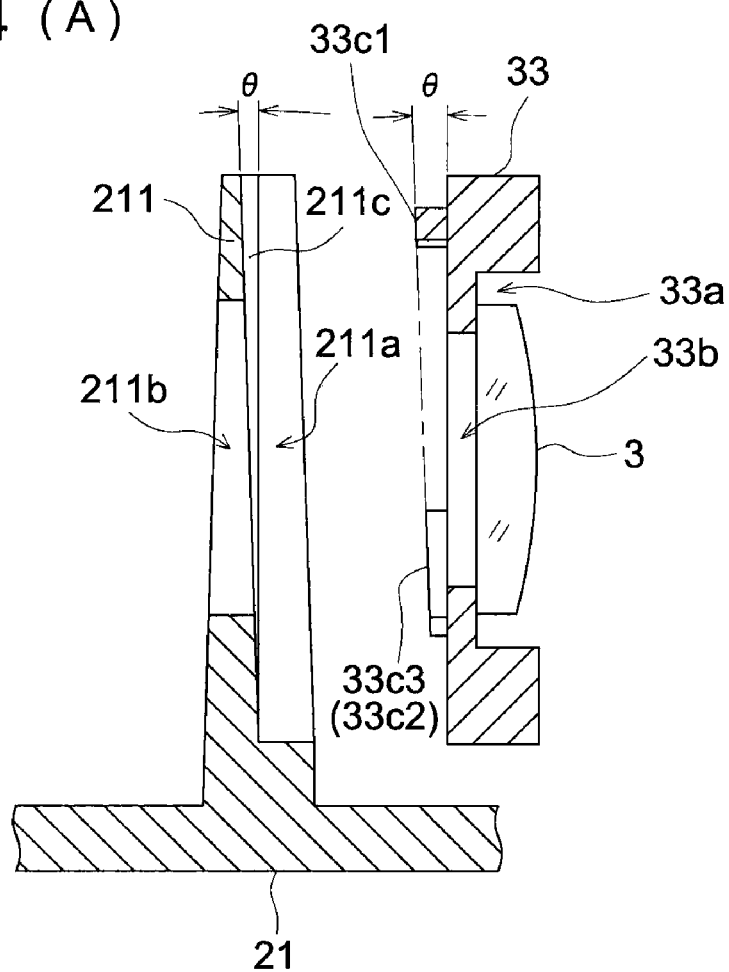
FIGS. 4(A) and 4(B) show a cross sectional view of the third lens group and a lens frame, and a plan view of a lens frame.
Figure 4:
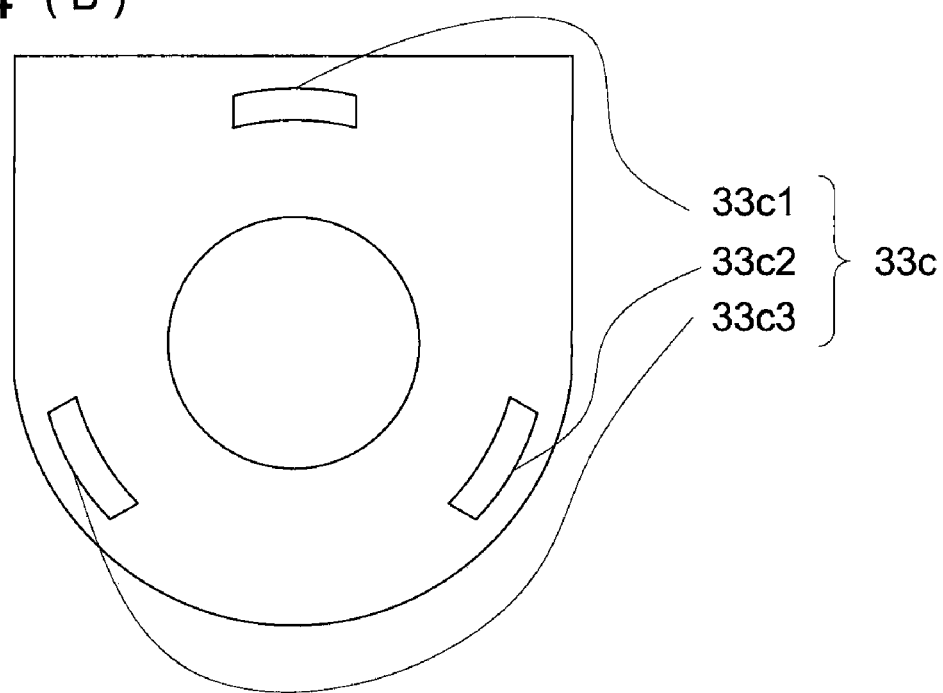
Figure 5:
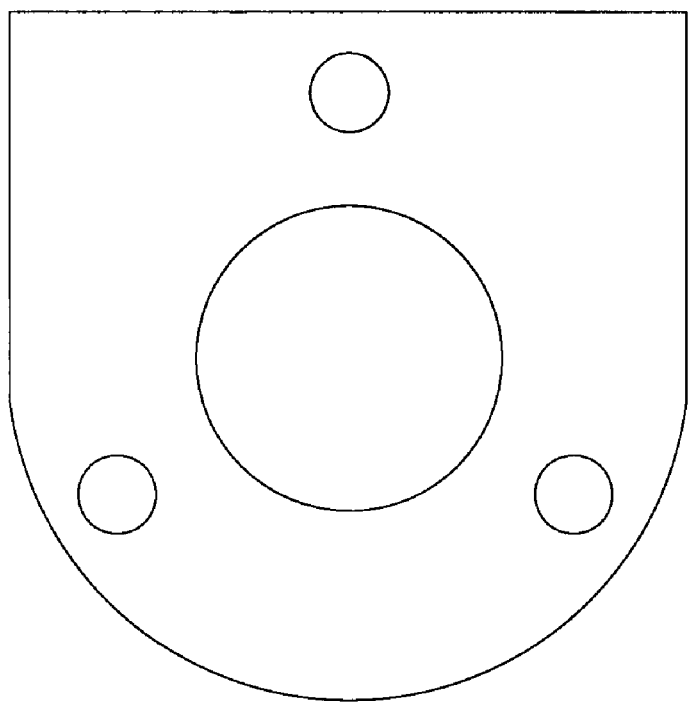
FIG. 5 shows a cross sectional view and a plan view of a lens frame having protrusions each being different in terms of height.
Figure 5:
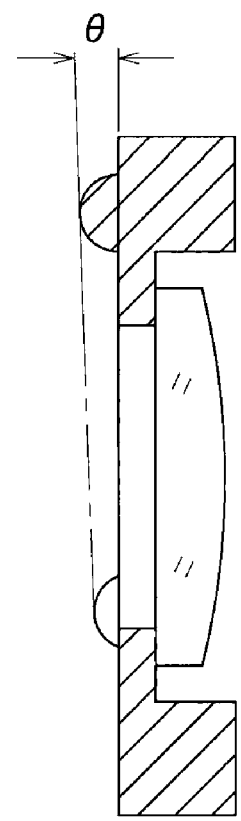

Next, the third lens group 3 and lens frame 33 will be explained in detail as follows, referring to FIGS. 3-5. FIG. 3 is a perspective view of the third lens group 3 and lens frame 33. FIG. 4(A) is a sectional view for the third lens group 3 and lens frame 33, and FIG. 4(B) is a plan view of lens frame 33 showing protrusions. FIG. 5 shows a cross sectional view and a plan view of lens frame 33 having protrusions in another shape.

First, housing 21 in FIG. 3 is formed to have an almost U-shaped cross section as stated earlier, and wall portion 211 that holds lens frame 33 is formed to extend in the direction almost perpendicular to optical axis OB. Further, on the wall portion 211, there is provided horseshoe-shaped concave section 211a for holding lens frame 33. On the concave section 211a, there is provided through hole 211b through which light emitted from third lens group 3 passes.

On the lens frame 33, there is provided concave section 33a that holds the third lens group 3. On the concave section 33a, there is provided through hole 33b through which light emitted from third lens group 3 passes.

In the structure constituted in the aforesaid manner, lens frame 33 is inserted into concave section 211a of the wall portion 211 to be glued with adhesive agents. In the meanwhile, the concave section 211a defines the position of the lens frame 33 in vertical and horizontal directions without rotation, because an inner dimension of the concave section 211a is formed to be slightly larger than an outer dimension of the lens frame 33.

Next, the third lens group 3 is mounted in concave section 33a of lens frame 33, and an inner dimension of the concave section 33a is formed to be larger than an outer dimension of the third lens group 3 by several millimeters.

Under the state of constitution made up in the aforesaid manner, lens barrel 70 before adjustment is assembled by mounting the aforesaid lens groups 1-6, optical filter 7 and image pickup element 8 in housing 21, and the lens barrel 70 is fit on a prescribed jig. Then, the image pickup element 8 is wired, and a prescribed chart is photographed with lens barrel 70 to be displayed on a monitor. Under this condition, the third lens group 3 is shifted for shift-adjustment in the direction perpendicular to optical axis OB while observing an image of the chart displayed on the monitor, and then, the third lens group 3 is fixed on lens frame 33 with adhesive agents when the image quality of the image of the chart turns out to be the desired condition.

Alternatively, in some cases, the third lens group 3 may also be shifted for shift-adjustment under the condition wherein specific lens groups are mounted to the lens barrel.

Further, for the shift-adjustment, the third lens group 3 is moved in the direction perpendicular to optical axis OB by using an unillustrated jig, while applying constant force to concave section 33a of lens frame 33 in the direction of image pickup element 8.

In the meanwhile, housing 21 is formed through injection molding of resin. Since a surface of housing 21 on one side opens as stated earlier, a metal mold that forms an inside of the housing 21 is drawn out in the direction toward the opening section. Therefore, a draft angle is needed for forming wall portion 211 of the housing 21 as shown in FIG. 4(A). Namely, the wall portion 211 inclines at angle θ away from a direction perpendicular to the optical axis OB. Thus, wall portion 211c that comes contact with lens frame 33 in concave section 211a of wall portion 211 becomes an inclined surface. Therefore, if lens frame 33 simply comes contact with wall portion 211c, the lens frame 33 is mounted with undesired tilt. As a result, it causes the state of tilt where an optical axis of the third lens group 3 inclines away from optical axis OB, and the lens barrel shows lower image quality as an image pickup optical system.

Therefore, as shown in FIG. 4(B), there is provided plural protrusions 33c1, 33c2, and 33c3 protruding from a surface of lens frame 33 facing the wall portion 211c side, to tilt tip surfaces of the plural protrusions 33c1, 33c2, and 33c3 at the same angle θ. It solves problems that the third lens group 3 is tilted when plural protrusions 33c1, 33c2, and 33c3 come contact with the wall portion 211c and that image quality of an image pickup optical system is lowered by a draft angle of housing 21.

When the image pickup optical system has an optical system bending the optical axis of light as in the present embodiment, it is difficult to draw a metal mold that forms an inside of housing 21 in the direction of optical axis OB, because an optical axis is bent on prism 12. Therefore, the metal mold that forms an inside of housing 21 is drawn in the direction perpendicular to optical axis OB, by using a draft angle for wall portion 211, as stated above. In the structure of this kind, in particular, it is possible to effectively adjust tilt of the third lens group 3 caused by the draft angle of housing 21 by causing plural protrusions 33c1, 33c2, and 33c3 to protrude from a surface of lens frame 33 facing the wall portion 211c side.

Though a draft angle is drawn in FIG. 4(A) to be a large angle for the purpose of showing clearly, actual angle of θ of the draft angle is about 1°, for example, and a dimension of lens frame 33 is also small. Therefore, in FIGS. 4(A) and 4(B), even if the tip surfaces of protrusions 33c1, 33c2, and 33c3 are formed on the surface vertical to optical axis OB without being formed on the inclined surface, an influence therefrom is small. Therefore, in FIG. 4(B), it is possible to make a protruding amount of protrusion 33c1 in FIG. 4(B) to be greater than a protruding amount of protrusions 33c2 and 33c3 and to make a protruding amount of protrusion 33c2 and 33c3 to be the same, so that protrusion 33c1 and protrusions 33c2 and 33c3 form a step corresponding to angle θ.

Further, it is preferable that each of protrusions 33c1, 33c2, and 33c3 has an area with predetermined dimension because there is a fear that that protrusions 33c1, 33c2, and 33c3 press and partially deform wall portion 211c. However, if there is no such fear, the protrusions can be formed to be in a form of hemisphere to realize a point-contact type.

Further, with respect to the number of protrusions, three is preferable, but four or more is acceptable according to circumstances.

Alternatively, the plural protrusions 33c1, 33c2, and 33c3 can be formed such that the third lens group 3 is intentionally tilted away from optical axis OB by a small angle, in order to improve image quality by correcting the tilt of the entire image pickup optical system, rather than formed such that the draft angle of wall surface 211c of wall portion 211 is same as an angle to be corrected by the plural protrusions 33c1, 33c2, and 33c3.

It is further possible to mold the housing without providing a draft angle on the wall portion. In this case, however, deformation and shrinking of the housing would be caused after molding, because of characteristics of resin. In some cases, a wall surface of a wall portion further would be inclined opposite to that of a draft angle. Even in this case, the tilt of an adjusting lens can be reduced by providing plural protrusions 33c1, 33c2, and 33c3 each having a different protruding amount of on lens frame 33 in the same way as in the aforesaid description.

Further, even in the case where the housing is molded without providing a draft angle on the wall portion and no inclination is caused on the wall portion after molding, the lens barrel would not provide sufficient lens property in some cases, because of a relationship of the wall portion and a lens frame that holds other lenses. The plural protrusions 33c1, 33c2, and 33c3 each having a different protruding amount on lens frame 33 also can provide better lens property by intentionally tilting the adjusting lens in some cases.

Incidentally, when an image pickup optical system does not include an optical system which bents the optical path as a prism and all lens groups are arranged on an optical axis forming one straight line, it is possible to draw out a metal mold that forms the inside of the housing in the direction of an optical axis (for example, direction of optical axis OB in FIG. 2(A)) when forming housing 21. Even if the lens barrel constituted in the way mentioned above, it is possible to expect the same effect as in the aforesaid case of molding without providing a draft angle on the wall portion.

In addition, in the embodiment explained above, lens frame 33 is fixed on wall portion 211, and after that, the third lens group 3 is shifted for shift-adjustment away from lens frame 33. However, it is also possible to fix the third lens group 3 on lens frame 33 in advance, and to adjust the lens frame 33 in the direction perpendicular to the optical axis away from housing 21, namely, to shift the lens frame 33 away from wall portion 211. In this case, the third lens group 3 and concave portion 33a of lens frame 33 are caused to be in the state of fitting, and inner dimension of the concave section 211a is formed to be greater than an outer dimension of the third lens group 3 by several millimeters.

In the meanwhile, a lens frame generally has a higher degree of freedom for molding, compared with a lens. Thus, a shape of the lens frame can be formed in an arbitral shape corresponding to a shift-adjusting method, without being limited to a horseshoe-shape shown in FIG. 3. Therefore, in the lens barrel constructed so that lens frame 33 is shifted for shift-adjustment in the direction perpendicular to the optical axis away from housing 21, employing lens frame 33 realizes both shift-adjustment and tilt-adjustment of adjusting lens easily.

Additionally, the third lens group 3 is close to shutter unit S in lens barrel 70 in FIG. 2(A), and it is difficult to conduct the shift-adjustment of the third lens group 3 because of an obstruction by shutter unit S. In this case, the shutter unit S can be mounted after the third lens group 3 is shifted for shift-adjustment.

Further, it is preferable that housing 21 is composed of a single body, and holds lenses (for example, second-fifth lens groups) in the image pickup optical system which are arranged on an optical axis segment forming one straight line on which the third lens group (adjusting lens) is arranged. Owing to this, lenses arranged at the front and the rear of the third lens group (adjusting lens) are held by the housing 21 formed as one body, which makes it possible to obtain a lens barrel having better lens property. Further, when an image pickup optical system has therein an optical system which bends an optical path of the light entering thereto, lens arrangement at the front and the rear of a prism representing a portion where an optical axis is bent also has an influence on lens property. Therefore, when housing 21 is composed of a single body and holds the entire image pickup optical system, a lens barrel having still better lens property can be obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens barrel comprising:
    an image pickup optical system comprising a plurality of lenses including an adjusting lens for a shift adjustment in a direction perpendicular to an optical axis of the image pickup optical system;
    a lens frame holding the adjusting lens; and
    a housing holding the lens frame and comprising a wall portion extending along a direction substantially perpendicular to the optical axis of the image pickup optical system,
    wherein the lens frame comprises a plurality of protrusions coming contact with the wall portion and each of the plurality of protrusions has a protruding amount which differs from the other for correcting a tilt of an optical axis of the adjusting lens.

2. The lens barrel of claim 1,
wherein the housing comprises a cross section in a direction perpendicular to the optical axis of the adjusting lens, and
the cross section opens facing a predetermined direction so as to forming a U-shape.

3. The lens barrel of claim 1,
wherein the wall portion inclines at a predetermined angle away from a direction perpendicular to the optical axis of the image pickup optical system to form a draft angle for molding the housing.

4. The lens barrel of claim 1,
wherein the adjusting lens is shiftable for the shift adjustment away from the lens frame in a direction perpendicular to the optical axis of the image pickup optical system.

5. The lens barrel of claim 1,
wherein the lens frame holding the adjusting lens is shiftable for the shift adjustment away from the housing in a direction perpendicular to the optical axis of the image pickup optical system.

6. The lens barrel of claim 1,
wherein a through hall for transmitting an effective light flux emitted from the adjusting lens is formed on each of the lens frame and the wall portion.

7. The lens barrel of claim 1,
wherein the image pickup optical system is a variable power optical system and comprising a plurality of lens groups moving along the optical axis of the image pickup optical system for varying a power of the image pickup optical system, and
the adjusting lens does not move along the optical axis of the image pickup optical system for varying the power.

8. The lens barrel of claim 1,
wherein the image pickup optical system comprises an optical system for bending an optical path of a light flux entering thereto.

9. The lens barrel of claim 1,
wherein the housing is formed as one body and holds lenses arranged on an optical axis segment forming one straight line on which the adjusting lens is arranged.

10. An image pickup apparatus comprising:
a lens barrel of claim 1.

* * * * *